UNITED STATES PATENT OFFICE.

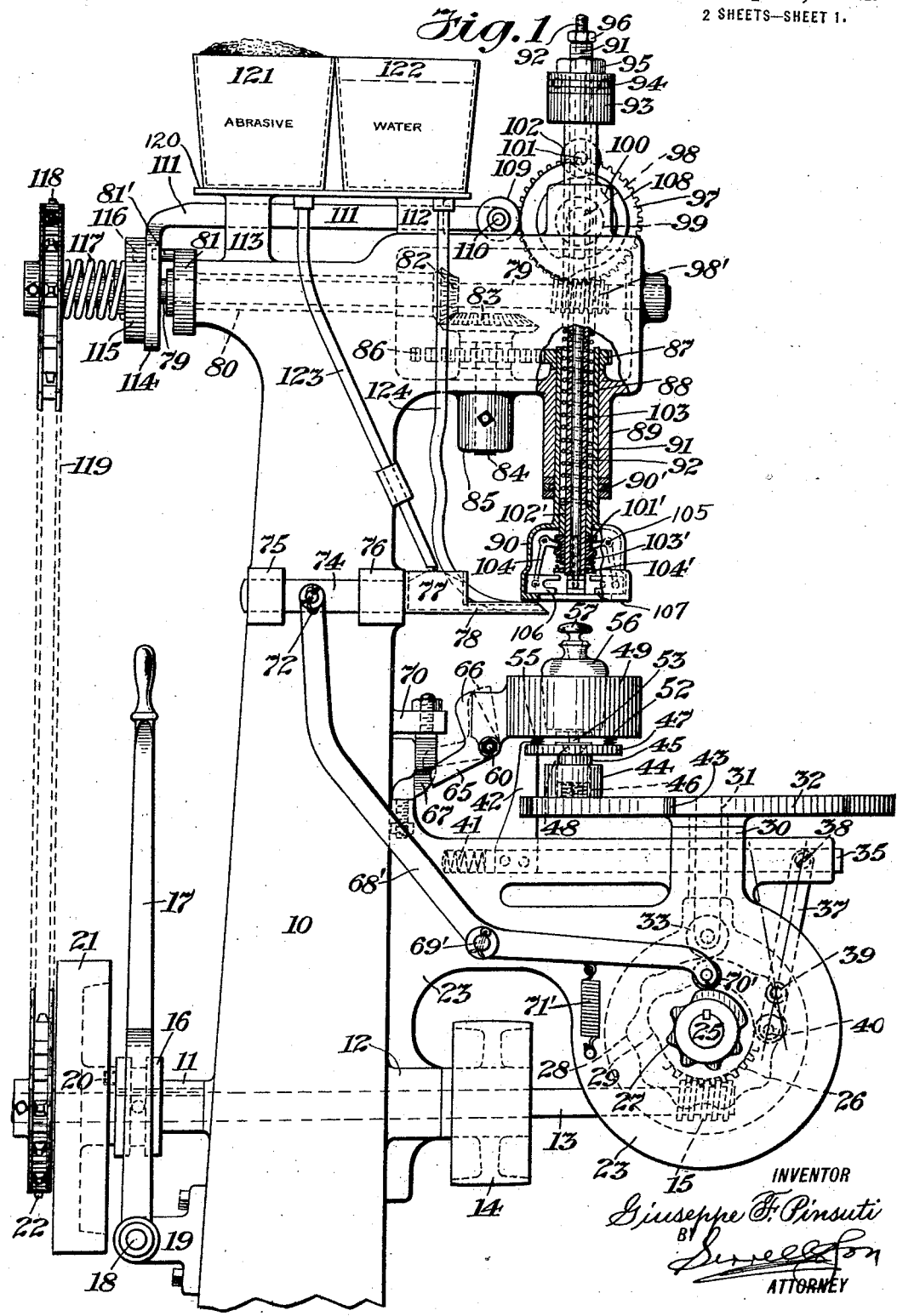

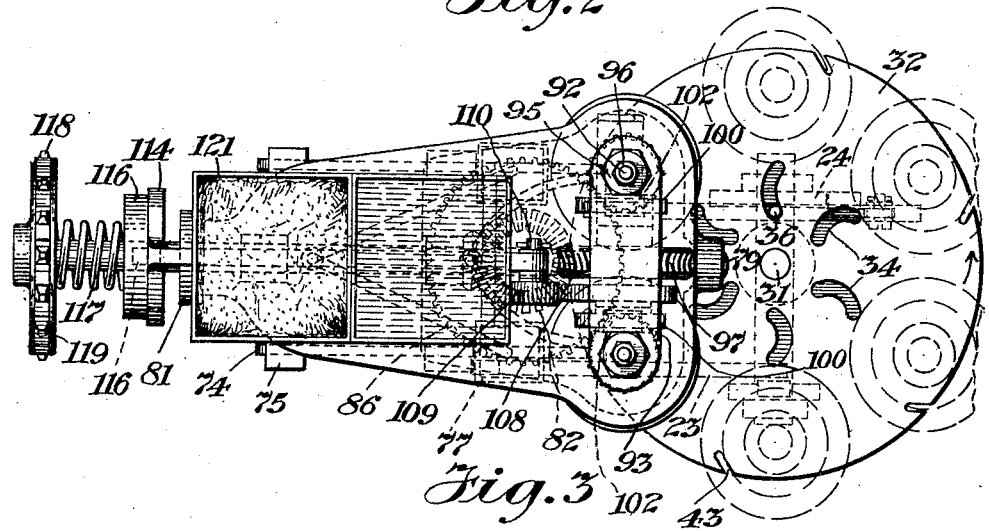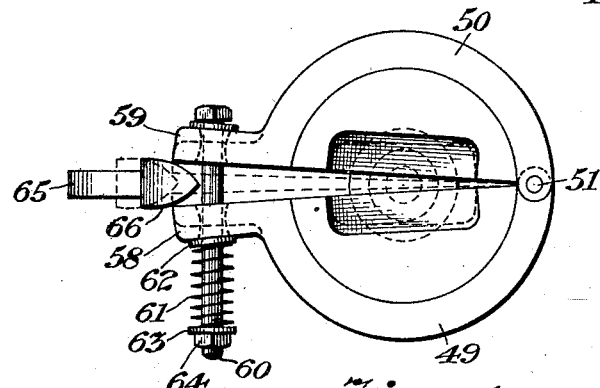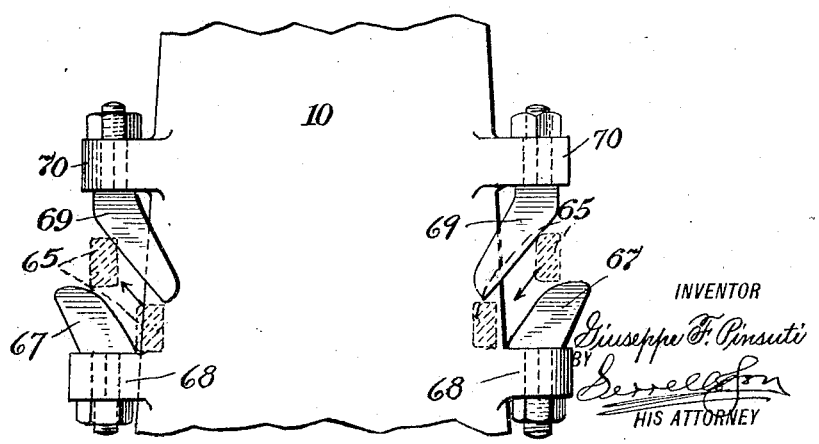

GIUSEPPE F. PINSUTI, OF NEW YORK, N. Y.

MACHINE FOR GRINDING GLASS BOTTLE STOPPERS.

1,411,511. Specification of Letters Patent. Patented Apr. 4, 1922.

Application filed December 11, 1918. Serial No. 266,179.

*To all whom it may concern:*

Be it known that I, GIUSEPPE F. PINSUTI, a citizen of the United States, residing in the borough of Manhattan, city, county, and State of New York, have invented an Improvement in Machines for Grinding Glass Bottle Stoppers, of which the following is a specification.

This invention relates to a machine for grinding the stoppers into the necks of glass bottles. As is generally understood, glass bottles as commonly employed for medicines, chemicals, perfumery and various other substances, are provided with glass stoppers which are ground to place in the necks thereof. Heretofore, so far as I am aware, it has been customary to grind the stoppers into the necks of glass bottles by manual operations, and the object of my invention is the provision of a machine for doing this work. In carrying out the invention, the apparatus preferably comprises a feeding mechanism upon which the bottles are placed and by which the bottles are conveyed to position in which the stoppers are ground to place in the necks thereof, together with means for holding the bottles during the grinding operation, devices for gripping the stoppers while being ground to place, means for producing a relative turn movement between each bottle and its stopper as well as an intermittent removal of the stopper from the neck of the bottle during the grinding operation, and means for supplying a suitable abrasive material to the neck of the bottle during the grinding operation, all of which will be hereinafter more particularly described.

In the drawing:

Figure 1 is a side elevation illustrating my improved machine for grinding glass stoppers into the necks of bottles.

Fig. 2 is a plan of the same.

Fig. 3 is an enlarged plan view illustrating the bottle retaining device, and

Fig. 4 is an elevation of a portion of the frame of the machine and the cam members by which the bottle retaining devices are operated.

As will be seen by reference to the drawing, in carrying out this invention, the machine embodying the same comprises a frame, a portion of which is indicated at 10 and which as will be understood may be mounted upon any suitable base. In suitable positions on the frame of the machine there are bearings 11 and 12 in which a drive shaft 13 is journaled. On the drive shaft 13 on one side of the frame there is secured a pulley 14 by means of which through a suitable belt the drive shaft is driven. On the same side of the frame as the pulley 14 and preferably at the extremity of the drive shaft 13, there is a worm indicated at 15. On the opposite side of the frame a clutch collar 16 is mounted on the drive shaft 13. This clutch collar 16 is operated by a lever 17 pivoted at one end as indicated at 18 in a bracket 19 which is secured to the frame 10. In the clutch collar 16 there is a pin 20 adapted to engage in a recess provided therefor in the hub of a clutch pulley 21 associated with which there is a sprocket wheel 22.

Suitably secured to the frame 10 there are brackets 23 and 24, extending between which and journaled therein is a shaft 25. On the shaft 25 there is a gear 26 meshing with the worm 15 so that through these members the shaft 25 is turned from the drive shaft 13. Also suitably secured on the shaft 25 there are cams indicated respectively at 27, 28 and 29. Supported upon the brackets 23 and 24 there is a bearing 30 in which is journaled a spindle 31. At the upper end of the spindle 31 there is secured a revoluble table 32, while at the lower end of the spindle 31 there is mounted a roller 33 bearing against the faces of the cam 28. In the revoluble table 32 there is a plurality of curved slots 34 each adapted to receive a pin 36 carried by a reciprocating rod 35 which moves in a suitable guide provided therefor in the bracket 24. Adjacent its outer end, the reciprocating rod 35 is provided with a pin 38 to which one end of a lever 37 is pivotally connected. The lever 37 is pivotally mounted as indicated at 39 in the bracket 24 and at its opposite end is provided with a roller 40 bearing against the face of the cam 29. The roller 40 is normally maintained in position against the face of the cam by means of a spring 41 or otherwise acting against the end of the rod 35 as is clearly indicated in Fig. 1 of the drawing. Also at the inner end of the rod 35 the same is provided with a latch member 42 adapted to enter slots 43 in the periphery of the revoluble table 32 for a purpose which will be hereinafter described.

Mounted on the revoluble table 32 there is a plurality of blocks 44; the position of these blocks is indicated diagrammatically in Fig. 2 and as they are all similarly constructed, only one of them will be described. Each block 44 is provided with a bore adapted to receive a plunger 45 which rests upon a spring 46 extending between the inner or lower end of the plunger and the base of the bore in the block. Each plunger 45 carries a disk 47 in which there is a recess or socket 48. On each disk 47 there is a bottle holder or retainer perferably made in halves indicated at 49 and 50 pivoted to one another as indicated at 51. The base 52 of each bottle retainer includes a stud 53 having a ball end adapted to be received in the socket 48 in the corresponding disk, and each bottle retainer is yieldingly supported upon the corresponding disk by springs 55 or otherwise. 56 represents a bottle and 57 a stopper, and these are illustrated in position in the retainer in Fig. 1 of the drawing. The part 49 of each bottle retainer is provided with a flange 58 and the part 50 with a corresponding flange 59. These flanges 58 and 59 are provided with openings through which a bolt 60 is passed. Surrounding the bolt 60, there is a spring 61 extending between a washer 62 bearing against the flange 58, and a washer 63 bearing against a nut 64 at the extremity of the bolt so that the action of the spring is normally to maintain the parts 49 and 50 of the bottle retainer in their closed positions. Pivotally mounted in the flange 58 there is a lever 65. The arm 66 of this lever is wedge-shaped and extends and lies between the flanges 58 and 59 so that by moving the arm 66 on its pivotal point, the flanges 58 and 59 are spread to open the parts of the retainer when the arm 66 is swung from left to right, as indicated at Figs. 1 and 3, to move the parts of the retainer against the action of the spring 61, whereas when the arm 66 is moved in the opposite direction, the flanges 58 and 59 are forced toward one another by the action of the spring 61 to cause the parts of the retainer to close upon the walls of a bottle to hold the same in place. In order to operate this bottle retainer, there are cams 67 and 69 secured respectively in lugs 68 and 70 on the frame 10. As will be apparent by reference to Fig. 4, when the arm 65 rides up on the cam 67 due to a partial revolution of the table 32, the wedge-shaped arm 66 will be forced between the flanges 58 and 59 to spread the parts of the retainer, whereas when the arm 65 is forced downwardly by the cam 69 the wedge-shaped arm will be withdrawn from the flanges 58 and 59 permitting the spring 61 to close the parts of the retainer.

As will now be understood, the revoluble table 32 is turned intermittently through partial revolutions to successively bring the bottle retainer into the position to close the same upon the bottle, and when closed, the bottle will be in a position in which the stopper is ground to place in the neck thereof. At the same time when in this position through the reciprocation of the spindle 31 by means of the cam 28, the bottle will be raised and lowered any desired number of times to move the same into and out of contact with the stopper during the grinding operation. When thus raised, the table will be free from the pin 36 and through the action of the spring 41, the rod 35 is returned to its normal position in which the roller 40 bears against the face of the cam 29. When the table 32 is again lowered to its normal position, the pin 36 will enter the next succeeding slot 34 in the table 32 so that when the nose of the cam 29 comes into contact again with the roller 40, the rod 35 will be moved from right to left again as indicated in Figs. 1 and 2 and the table turned another partial revolution.

I also employ a lever 68' which is pivotally mounted in the bracket 23 as indicated at 69', and is fitted with a roller 70' adapted to bear against the face of the cam 27. At its opposite end, the lever 68' is provided with a slot 72 through which is passed a pin 73 mounted on a shaft 74 which is journaled in bearings 75 and 76. The shaft 74 is provided with receptacles 77, from each of which extends a chute 78, the purpose of which will be hereinafter described, it being understood that the roller 70' is maintained in contact against the faces of the cam 27 by a spring 71' or otherwise, and the function of the lever 68' is to reciprocate the shaft 74 and the receptacles 77 and chutes 78 carried thereby.

Mounted in the upper portion of the frame 10, there is a shaft 79, and fitting over a portion of the shaft 79 there is a sleeve 80. On one end of the sleeve 80 there is a clutch pulley 81 carrying a pin 81', and on the opposite end of the sleeve there is a bevel gear 82. Meshing with the bevel gear 82 is a bevel gear 83 secured on a shaft 84 journaled in the bearing 85 which forms part of the upper portion of the machine. On the shaft 84 there is also a spur gear 86 meshing with a spur gear 87 secured to a sleeve 88 which is journaled in a bearing 89 forming a part of the upper portion of the machine. Suitably secured to the lower end of the sleeve 88 there is a chuck head 90, while between the lower end of the bearing 89 and the chuck head 90, I prefer to employ a suitable bearing indicated at 90'. Extending through the sleeve 88 there is a hollow shaft 91, and within the hollow shaft, a rod 92. The hollow shaft 91 and the rod 92 extend also through the upper portion of the frame of the machine and through a cross bar 93 which is suitably fixed in the upper portion of the machine. Above the cross bar there is a bearing 94 and on the upper end of the hollow shaft 91 there is a nut 95 adapted to be turned down against the upper member of the bearing 94, while on the upper end of the rod 92 there is a nut 96 adapted to be turned down against the upper end of the hollow shaft 91, so that the position of the hollow shaft is vertically adjustable relatively to the chuck head; and the rod 92 is vertically adjustable within the hollow shaft 91.

In the upper portion of the machine, there is also a gear 97 secured on a cross shaft 98 which is journaled in bearings 99 in the upper portion of the frame of the machine. The gear 97 meshes with a worm 98' provided for this purpose on the shaft 79, so that the shaft 98 is turned from the shaft 79 through the worm 98' and the gear 97. On the shaft 98 there is a cam 100 and running on the face of the cam 100 is a roller 102 mounted on a trunnion 101 which is suitably connected to the hollow shaft 91 so that the hollow shaft 91 and the rod 92 are vertically reciprocated by the cam 100 through the roller 102 which is maintained against the face of the cam by a spring 103 which extends between a portion of the upper frame of the machine and a collar 102' secured in any one of a number of positions adjacent the lower end of the hollow shaft 91 within the sleeve 88. Below the collar 102' a grooved collar 101' is also mounted on the lower end of the hollow shaft 91 in a position to lie within the chuck head 90; this collar 101' being mounted to turn freely on the end of the hollow shaft 91. Adjacent the lower extremity of the hollow shaft 91, there is fixed a disk 104', and in order to normally maintain the revoluble collar 101' against the fixed collar 102', I employ a spring 103' extending between a shoulder on the revoluble collar 101' and the disk 104'. Within the chuck head 90, I employ a series of bell crank levers 104, each pivotally mounted therein at 105, so that the extremities of the short arms of the bell crank levers engage in the groove of the revoluble collar 101', while the ends of the long arms of the bell crank levers are pivotally connected to grippers 106 adapted to move in slide ways 107. These grippers 106, irrespective of their number are adapted to engage the stopper of the bottle so as to hold the same in the proper position during the grinding operation.

On the shaft 98, there is also mounted a cam 108. Bearing against the face of the cam 108, there is a roller 109 mounted on a spindle 110 secured at one end of a rod 111. The rod 111 is journaled in bearings provided therefor in extensions 112 and 113 in the upper portion of the frame of the machine, while at its opposite end, the rod 111 is provided with an extension arm 114 turned at right angles thereto and through which the shaft 79 passes. On the shaft 79 adjacent the arm 114, a clutch pulley 115 is suitably secured. This clutch pulley 115 is provided with a recess 116 adapted to receive the pin 81' on the clutch pulley 81 and the rod 111, and associated parts are maintained in position with the roller 109 bearing against the face of the cam 108 by a spring 117 surrounding the shaft 79 and extending between the clutch pulley 115 and the hub of a sprocket 118 which is also secured on the shaft 79 in the same plane as the sprocket 22. Passing over the sprockets 22 and 118 there is a chain 119 so that the shaft 79 is driven from the shaft 13 through the clutch pulley 21, when the same is connected to the collar 16 so as to be turned by the shaft 13.

Suitably secured to the extensions 112 and 113 of the frame, there is a table 120 adapted to carry the receptacle 121 and 122, one of which contains a quantity of powered sand or other suitable abrasive material and the other is supplied with water. Extending from the receptacle 121 is a pipe 123 which may be suitably divided to supply the abrasive material to the receptacles 77, and extending from the receptacle 122 is a pipe 124 which also may be suitably divided to convey the necessary water to the chutes 78 to be combined with the abrasive material when supplied to the neck of the bottles for the grinding operation, it being understood of course that any suitable means may be employed to regulate the flow of the abrasive material through the pipe 123 as well as the flow of the water through the pipe 124.

In the operation of the hereinbefore described apparatus, the bottles into the necks of which the stoppers are to be ground, are placed in the bottle holders 49 while the same are in an open position, and assuming the lever 17 has been thrown to connect the clutch pulley 21, the drive shaft 13 as well as the shaft 79 will be continuously revolved. The revoluble table 32 is intermittently moved a partial revolution to successively bring a pair of bottle holders into the grinding position. This, as hereinbefore described, is effected through the rod 35 which is reciprocated intermittently by the lever 37 and the cam 29 acting upon the revoluble table by the pin 36 successively engaging the slots 34. As each bottle holder is brought into the grinding position, the lever arm 65 is forced downwardly and the spreader arm 66 moved out of the flanges 58 and 59, permitting the spring 61 to force these flanges together so as to close the parts of the bottle holder upon the bottle to secure it in position for the grinding operation. After the bottle holder is brought into position, the table is moved upwardly through the action of the cam 28 against the roller 33, when as will be understood, the pin 36 is released from the slot 34 in which it was engaged, and through the action of the spring 41, the rod 35 is returned to its normal position with the roller 40 against the face of the cam 29, in which position the pin 36 is so placed as to be received in the next succeeding slot 34 when the revoluble table 32 is again permitted to descend. When the rod 35 is returned to its normal position, the latch member 42 enters one of the slots 43 in the periphery of the table so as to lock the same in place. With the parts in these positions, as will be understood, the bottle is clamped and yieldingly supported so as to make a rocking motion thereof possible in the bottle holder 49. When the reciprocating table 32 is in a raised position, the clutch head and the hollow shaft 91 and the rod 92 therein are so adjusted that when operated the grippers 106 engage the stopper of the bottle to hold the same during the grinding operation, the grippers being moved, as will be understood, by the upward movement of the hollow shaft 91 therein against the action of the spring 103, these parts carrying with them the grooved collar 101' which is moved upwardly against the action of the spring 103', so that there is made possible a yielding gripping action between the grippers and the bottle stopper when engaged thereby.

In addition to this yielding action of the grippers 106, it will be apparent that by shifting the collar 102' on the hollow shaft 91 the extent of the movement of the grippers may be adjusted to accommodate the grippers to stopper heads having varying diameters and that this will in no wise interfere with the yielding action of the grippers in engaging the stopper heads. After the grippers have engaged the bottle stopper, the roller 109 runs on to the depressed portion of the cam 108 permitting the clutch pulley 115 to be engaged with the clutch pulley 81 thereby turning the sleeve 80 and through the bevel gears 82 and 83 as well as the gears 86 and 87, causing the sleeve 88 to turn and with it the gripper members 106 and the bottle stopper. While thus engaged, the revoluble table and the bottle are reciprocated several times through the action of the cam 28 and the roller 33 so that while being turned, the bottle stopper is inserted and withdrawn from the neck of the bottle, during which time, the shaft 74 is reciprocated so as to supply a predetermined quantity of abrasive material and water to the neck of the bottle for the grinding operation. After the grinding operation is completed, the revoluble table 32 is turned another partial revolution, and in so doing, the lever arm 65 rides up on the cam 67 forcing the arm 66 between the flanges 58 and 59 so as to open the parts of the bottle holder, making it possible to remove the bottle. Furthermore, as will be understood, the adjustment of the position of the hollow shaft 91 is to effect a relative movement of the gripper members 106, depending of course upon the size and diameter of the stoppers to be engaged, while the adjustment of the rod 92 in the hollow shaft 91 is to accommodate the grinding of stoppers having different length heads, inasmuch as the upper portion of the bottle stopper contacts with the lower end of this rod 92 during the grinding operation. It will furthermore be understood, that the parts may be so adjusted that a partial grinding of the bottle stopper in the neck of the bottle may be effected in the first grinding position and the grinding finished in the second grinding position in the machine as illustrated or the entire operation may be completed in one position, that is to say, a stopper may be partially ground to position in the neck of its bottle when the parts are engaged by the first grinding devices, as illustrated, and the grinding completed after the next shifting of the bottles and stoppers by the second set of grinding devices, as illustrated, or the conveyor or revoluble table may be shifted so that pairs of bottles and stoppers are brought to the grinding operation and the grinding of the stopper in the neck of each bottle completed at one operation. Furthermore it will be understood that while I have herein shown and described a revoluble table as a conveyor for the bottles and stoppers to carry the same to the grinding positions, any form of suitable conveyor for moving the bottles and stoppers to positions to be ground, may be employed without departing from the nature and spirit of this invention.

As hereinbefore described and illustrated in the drawing, the present invention has been made to relate to an apparatus for grinding the glass stoppers into the necks of glass bottles. Of course it will be understood however, that the invention is not specifically so limited, because in carrying out the same, it is quite possible to grind the stoppers and the neck of the bottles into such a uniform manner as I believe to make them interchangeable, which heretofore has not been possible. To this end of course, in so carrying out the invention, the stoppers may be turned in and ground by a suitable unit or grinder comprising a member in which there is a grinding socket provided and the necks of the bottles may be ground by turning therein a suitable standard plug made to the size of the stopper which is to be employed with the bottle. In either or both events of course, the required abrasive material is furnished to the parts during the grinding operation.

In so carrying out the invention, instead of employing the holder for receiving and gripping the bottles any suitable socket member may be held in position in the apparatus for grinding the stoppers, or instead of gripping the bottle stopper, a grinder plug may be substituted for the bottle stopper and used as a grinder for the necks of the bottles which then may be placed and conveyed to position for the grinding operation in the same manner as the bottles are in the apparatus hereinbefore specifically described.

I claim as my invention:

1. In a machine for grinding members one into another, a conveyor for carrying one of said members to a grinding position, and devices for gripping the said members when in the grinding position and producing a revoluble movement between them for effecting the grinding operation.

2. In a machine for grinding members one into another, a conveyor for holding and carrying one member to a grinding position, and means gripping and moving the other member to produce a relative revoluble movement between the said members for effecting the grinding operation.

3. In a machine for grinding glass stoppers in the necks of bottles, a conveyor for carrying a bottle and stopper to a grinding position, means for moving the bottle and stopper longitudinally of each other, and means for producing a relative revoluble movement between the bottle and its stopper for effecting the grinding operation.

4. In an apparatus for grinding glass stoppers into the necks of bottles, a conveyor for carrying an assembled bottle and stopper to a grinding position, means operative when the bottle and stopper are in the grinding position for gripping the bottle, means also operative when the bottle is gripped for producing an intermittent longitudinal movement between the bottle and stopper, and means for producing a continuous and relative revoluble movement between the bottle and stopper to effect the grinding operation.

5. In an apparatus for grinding glass stoppers into the necks of bottles, a conveyor for carrying an assembled bottle and stopper to a grinding position, means operative when the bottle and stopper are in the grinding position for gripping the stopper, means also operative when the bottle and stopper are in the grinding position for gripping the bottle, means for producing an intermittent longitudinal movement between the bottle and stopper, and means for producing a continuous revoluble movement between the bottle and stopper for effecting the grinding operation.

6. In a machine for grinding glass stoppers into the necks of bottles, a conveyor, a bottle holder yieldingly mounted on the conveyor, means for intermittently moving the conveyor to bring the bottle holder into position for the grinding operation, and means for gripping and turning the bottle stopper in the neck of the bottle to grind the same to position therein.

7. In a machine for grinding glass stoppers into the necks of bottles, a conveyor, a bottle holder yieldingly mounted on the conveyor, means for intermittently moving the conveyor to bring the bottle holder into position for the grinding operation, means for closing the bottle holder to grip the bottle as the same is brought into the grinding position and for opening the bottle holder after the grinding operation, and means for gripping and turning the bottle stopper in the neck of the bottle to grind the same to position therein.

8. In a machine for grinding glass stoppers into the necks of bottles, a conveyor, a bottle holder yieldingly mounted on the conveyor, means for intermittently moving the conveyor to bring the bottle holder into position for the grinding operation, means for closing the bottle holder to grip the bottle as the same is brought into the grinding position and for opening the bottle holder after the conveyor has moved the bottle holder from the grinding position, a stopper gripper, means for actuating the same to engage and hold the bottle stopper during the grinding operation, means for revolving the gripper members to grind the stopper into place in the neck of the bottle, and means for intermittently reciprocating the conveyor and bottle holder to move the bottle to and from the stopper during the grinding operation.

9. In a machine for grinding glass stoppers into the necks of bottles, a revoluble feed table, means for intermittently moving the same a partial revolution, a bottle holder mounted on the said table, and devices for gripping and turning the bottle stopper to grind the same to place in the neck of the bottle.

10. In a machine for grinding glass stoppers into the necks of bottles, a revoluble feed table, a bottle holder mounted thereon, means for intermittently turning the said feed table a partial revolution to bring the bottle holder to the grinding position, means for locking the feed table in place to secure the bottle holder in the grinding position, and means for gripping and turning the stopper of the bottle to grind the same to place in the neck thereof.

11. In a machine for grinding glass stoppers into the necks of bottles, a revoluble feed table, means for turning the feed table a partial revolution, a bottle holder mounted on the feed table, devices for raising and lowering the feed table and bottle holder when in the grinding position, and devices for gripping and turning the stopper of the bottle to grind the same to position in the neck thereof.

12. In a machine for grinding glass stoppers into the necks of bottles, a revoluble table, a bottle holder mounted thereon, means for turning the revoluble table a partial revolution intermittently to bring the bottle holder to the grinding position, devices for gripping and turning the bottle stopper within the neck of the bottle, means for moving the bottle to and from the stopper during the grinding operation, and means for locking the revoluble table and bottle holder in position during the grinding operation.

13. In a machine for grinding glass stoppers into the necks of bottles, a revoluble table, a bottle holder mounted thereon, means for turning the revoluble table a partial revolution intermittently to bring the bottle holder to the grinding position, means for closing the bottle holder when the same is brought to the grinding position and for opening the same upon leaving the grinding position, devices for gripping and turning the stopper of the bottle in the neck thereof, and means for raising and lowering the reciprocating table and the bottle holder thereon to move the bottle to and from the stopper during the grinding operation.

14. In a machine for grinding glass stoppers into the necks of bottles, a bottle holder, stopper grippers, a chuck in which the stopper grippers are mounted, means for actuating the grippers and chuck head to engage a bottle stopper and turn the same to grind the stopper to place in the neck of the bottle, and means for adjusting the extent of the movement of the grippers in being actuated to engage a bottle stopper.

15. In a machine for grinding glass stoppers into the necks of bottles, a bottle holder, a stopper gripper, a chuck in which the stopper gripper is mounted, means for actuating the stopper gripper and chuck to engage the stopper and turn the same to grind to position in the neck of a bottle, and a device adjustable to position for contacting with the upper portion of the bottle stopper while being engaged by the stopper gripper.

16. In a machine for grinding glass stoppers into the necks of bottles, a bottle holder, stopper grippers, a chuck in which the stopper grippers are mounted, means for actuating the grippers and chuck head to engage a bottle stopper and turn the same to grind the stopper to place in the neck of the bottle, means for adjusting the extent of the movement of the grippers in being actuated to engage a bottle stopper, and means for supplying an abrasive material to the neck of the bottle.

Signed by me this 5th day of December, 1918.

GIUSEPPE F. PINSUTI.